United States Patent

[11] 3,561,431

| [72] | Inventor | Karl A. Pannier, Jr.<br>Salt Lake City, Utah |
|---|---|---|
| [21] | Appl. No. | 735,837 |
| [22] | Filed | June 10, 1968 |
| [45] | Patented | Feb. 9, 1971 |
| [73] | Assignee | Sorenson Research Corporation<br>Salt Lake City, Utah<br>a corporation of Utah |

[54] CENTRAL VENOUS PRESSURE MONITOR SYSTEM AND MANOMETER SCALE THEREFOR
4 Claims, 5 Drawing Figs.

| [52] | U.S. Cl. | 128/2.05,<br>128/214 |
|---|---|---|
| [51] | Int. Cl. | A61b 5/02 |
| [50] | Field of Search | 128/2.05,<br>214; 73/402, 401; 73/323 |

[56] References Cited
UNITED STATES PATENTS

| 917,276 | 4/1909 | Faught | 128/2.05 |
|---|---|---|---|
| 1,474,853 | 11/1923 | Sheaff | 128/2.05X |
| 2,600,324 | 6/1952 | Rappaport | 128/2.05X |
| 2,866,453 | 12/1958 | Jewett | 128/2.05 |
| 3,124,133 | 3/1964 | Marbach | 128/2.05X |
| 3,242,920 | 3/1966 | Andersen | 128/2.05 |
| 3,435,819 | 4/1969 | Reynolds et al. | 128/2.09 |

Primary Examiner—William E. Kamm
Attorney—M. Ralph Shaffer

ABSTRACT: A system for monitoring the central venous pressure of a medical patient and, in particular, a manometer scale and flexible manometer-tube combination in such system wherein the liquid level in the tube is easily readable with reference to the index marks on the scale. The scale in a preferred form of the invention is frictionally retained by and slidable along the tube in a manner hereinafter described.

PATENTED FEB 9 1971 3,561,431
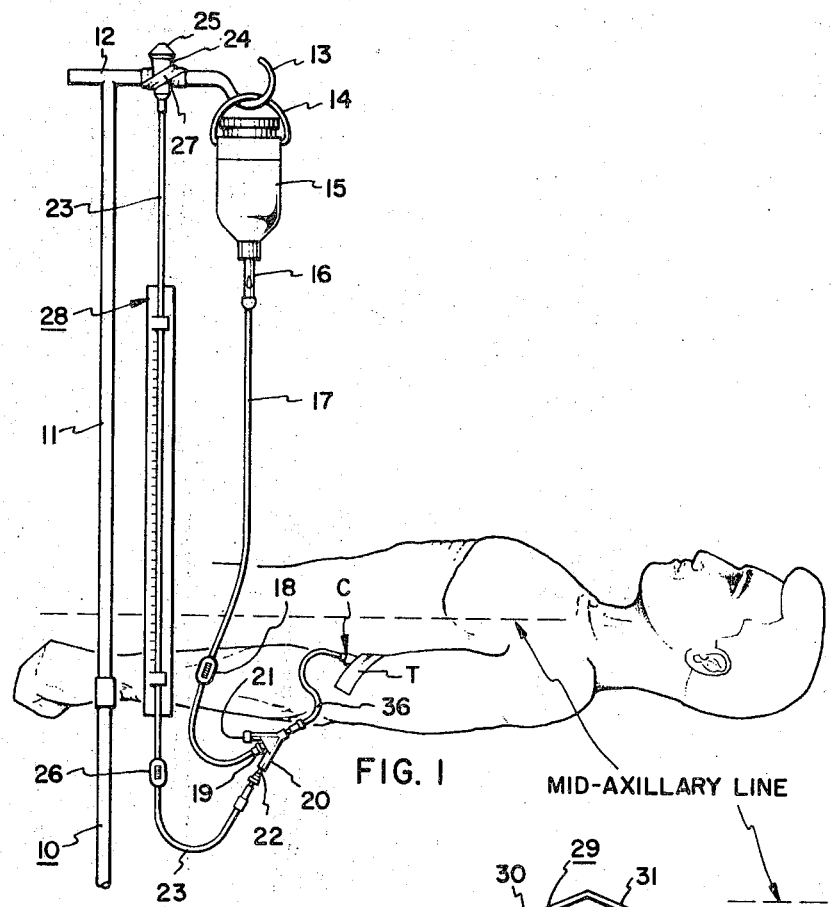
FIG. 1
MID-AXILLARY LINE
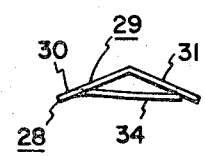
FIG. 3
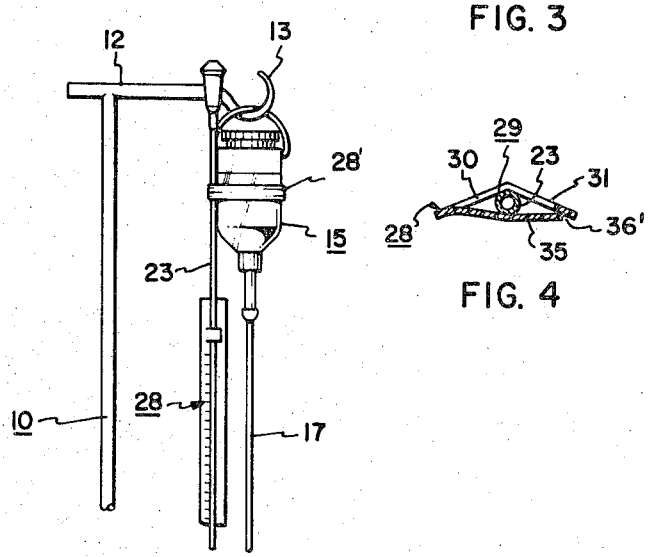
FIG. 4
FIG. 5
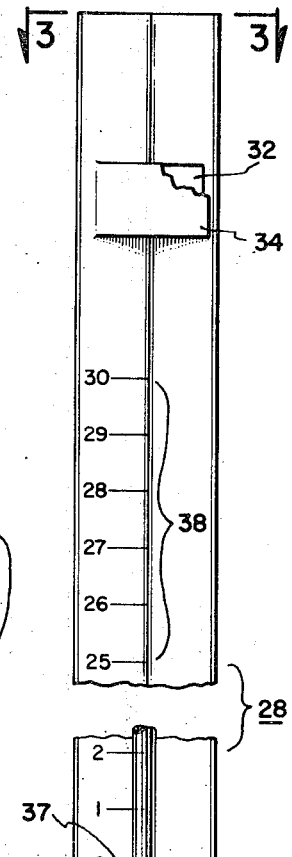
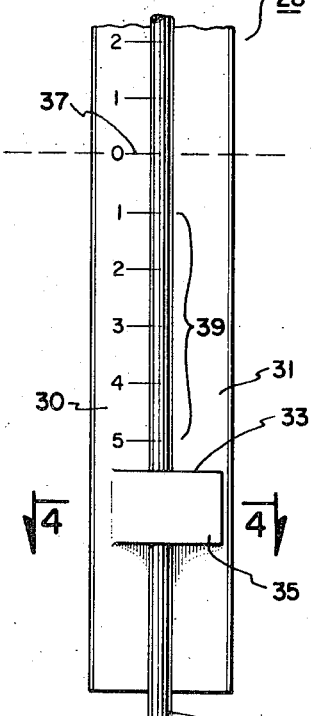
FIG. 2
INVENTOR.
KARL A. PANNIER JR.
BY
HIS ATTORNEY

CENTRAL VENOUS PRESSURE MONITOR SYSTEM AND MANOMETER SCALE THEREFOR

The present invention relates to central venous pressure systems for monitoring the central venous pressure of the medical patient, and, more particularly, provides a flexible manometer tube and scale combination in such system wherein the scale is directly mountable to the tube.

In the very recent past certain medical schools in the country have determined the need for monitoring blood pressure at the central venous reservoir of the heart, for various types of surgical procedures, observation of accident patients, and so forth. Customarily, the catheter is inserted into the neck or into the arm in one of the main veins, and the catheter tip is advanced to the central venous reservoir of the heart. An intravenous drip system is connected to the catheter, and a junction of the connection serves to connect a manometer tube the upper extremity of which is maintained above the liquid level in the intravenous bottle employed.

Customarily, some type of scale or reading device has been affixed to the intravenous standard used to support the bottle. Frequently, the patient has to be elevated or lowered or changed to a new position, at which times it becomes very cumbersome to untape a scale from a standard, rearrange it on the standard or on another standard, and then attempt to observe a reading of a liquid level in the manometer tube with reference to a scale often quite remote from the tube. Additionally, manometer scales used in establishing central venous pressure monitoring generally read only from zero, corresponding to the level of the right atrium of the heart, to positive pressures. There are situations in which negative pressures are developed, that is, where the heart is pumping or attempting to pump more fluid than is actually available at the central reservoir of the heart.

Accordingly, a principal object of the present invention is to provide a new and improved central venous pressure monitoring system.

A further object is to provide a manometer tube and scale combination in measuring blood pressures of medical patients.

An additional object is to provide a medical manometer tube scale having both positive and negative pressure readings.

A further object is to provide a manometer tube and manometer scale combination in a central venous pressure monitoring system wherein scale is easily attachable to and slidable along the manometer tube, and this in a manner to give various positions of zero index, positive pressure readings, and, preferably, negative pressure readings as well.

The features of the present invention which are believed to be novel are set forth with particularity in the appended claims. the present invention, both as to its organization and manner of operation, together with further objects and advantages thereof, may best be understood by reference to the following description, taken in connection with the accompanying drawings in which:

FIG. 1 is a side elevation in fragmentary view of a central venous pressure system constructed in accordance with the present invention and supported from intravenous standard, wherein the system is used in conjunction with determining the central venous pressure of a patient lying in supine position.

FIG. 2 is an enlarged elevation, shown partially in fragmentary view of a manometer scale used in conjunction with the invention.

FIG. 3 is an end view of scale of FIG. 2 and is taken long the lines 3—3 in FIG. 2.

FIG. 4 is a transverse cross section of the manometer scale of FIG. 2 and is taken along the line 4—4 in FIG. 2.

FIG. 5 is a fragmentary view similar to the upper portion of FIG. 1, but illustrates that the manometer tube and scale combination may be taped directly to the intravenous bottle instead of to the standard, this to facilitate transport of the patient, when desired.

In FIG. 1 intravenous standard 10 includes the customary vertical standard 11 and support bar 12 integral therewith. The outer extremity of support bar 12 is formed as a hook 13 which supports the bale 14 of intravenous bottle 15. For convenience of terminology, "bottle" shall refer to any glass or plastic bottle, flask, or other liquid container. Intravenous bottle 15 has a conventional drip control 16 to which intravenous supply tube 17 is connected. Supply tube 17 is provided with a conventional clamp 18, and the lower extremity of the supply tube is connected at 19 to junction fitting 20. Points 19, 21 and 22 are directed to junction inlets of fitting 20, and may be provided with the conventional, self-sealing puncture caps. To the forward end of fitting 20 is connected catheter extension 36 of catheter assembly C.

The point or connection 22 of the junction fitting 20 is connected a manometer tube 23, the upper extremity of which is provided with end fitting 24. End fitting 24 is open at 25 so that the interior of the manometer tube 23 is communicative with the atmosphere. A clamp 26 of conventional design is supplied manometer tube 23. It will be observed that the clamps 18 and 26 may be of the screw type, eccentric type, or other type so as to enable the adjustable constriction or closure of the respective tubes at the clamping points. For convenience of manufacture, the intravenous supply tube 17 and manometer tube 23 may be composed of the same material, such as polyvinyl tubing, have the same inside and outside diameters, and so forth.

Manometer tube 23 is shown to be taped by tape means 27 to support bar 12 of the standard. If desired, and as shown in FIG. 5, manometer tube 23 may be conveniently taped to intravenous bottle 15 by tape means 28'. The FIG. 5 embodiment is especially desirous when the patient is to be moved and where the intravenous bottle and manometer tube and scale are to accompany patient during his movement to a new location.

Of special importance in the invention is the inclusion of a manometer scale 28. It is shown that the same is mounted directly to manometer tube 23. In a preferred form of the invention the manometer scale 28 includes a base 29 of angulated cross section. This is to say, the longitudinal base halves 30 and 31 are integrally joined together in a unitary configurement. Spaces 32 and 33 are provided upon the shearing of formed tabs 34 and 35. These are displaced from the main angulated configuration of the scale as illustrated in FIGS. 3 and 4. Tabs 34 and 35, and/or their junctures to the scale proper, are made resilient so that the manometer tube 23 may be conveniently slipped into space 36', between the tabs' ends and the associated half of base 29, i.e., longitudinal base half 31. Such a manometer scale configuration enables the scale to be slid up and down manometer tube 23. Further, the construction will be such that the manometer tube frictionally mounts the scale so that the latter will not move in the absence of intended manual adjustment of the manometer scale on the tube.

FIG. 3 illustrates the cross-sectional configuration of the manometer scale prior to manometer tube insertion.

Of special importance is the arrangement of index lines on the manometer scale. A zero index line is located at 37. Positive pressure index lines are located thereabove and are arranged, preferably, in centimeter increments. It is most important, as is hereinafter pointed out, for negative pressure index lines additionally to be present. These are indicated below the zero index as are seen at 39. Positive pressure index lines are indicated generally at 38.

In operation, the equipment can be assembled as indicated in FIG. 1, with the end fitting 24 of the manometer tube 23 extending above the liquid level of intravenous bottle 15. Clamp 26 will pinch manometer tube 23 into closed condition, and with clamp 18 initially opened, the catheter will be inserted in one of the large veins, either at the neck or at the arm of the patient, and advanced in the usual manner. It is suggested, of course, that the intravenous bottle 15 be maintained at a high level and the drip control opened so as to allow for a maximum flow of liquid during catheter advancement.

The catheter is advanced through the vein in the usual manner, past the first rib and the last valve until the manometer tip is advanced into the central venous cavity, or superior vena cava. Exact placement is sometimes determined through use of a fluoroscope. Another method is to make a preliminary measurement prior to venipuncture by placing the patient's arm in an outstretched position, then by holding the actuator of the catheter assembly at the site intended for venipuncture and extending the conduit of the infusor of the assembly along the arm to the suprasternal notch. This distance indicates the point to which the actuator must be advanced to place the catheter within the superior vena cava. At any time during or even prior to the procedure above discussed, manometer scale 28 is attached to manometer 23 so that the former may be slidably yet frictionally disposed upon the latter. This is done by the ends of tabs 34 and 35 being opened with respect to the scale so as to permit tube placement, in a manner indicated in FIG. 4.

By suitable leveling means, the manometer scale is adjusted on tube 23 so that the zero index line 37 is exactly level with the right atrium of the heart, roughly the midaxillary line of the patient; the latter can be accurately determined and marked on the patient's body, following usual hospital procedures. At this point or prior thereto, the lower extremity of manometer tube 23 is attached to junction fitting 20. This can be accomplished through use of a conventional needle at the lower extremity of tube 23 and the same piercing the self-sealing cap provided fitting 20. This is all conventional.

With valves 18 and 26 open, the fluid from intravenous bottle 15 will rise up through the manometer tube so that the fluid level in the manometer tube will be at the same level as the liquid level in bottle 15.

When clamp 18 is manipulated so as to close off the supply tube 17, then the fluid level in manometer tube 23 will drop. Final catheter placement can be achieved by closely observing the liquid level in manometer tube 23. When there exists regular pulsations in this level of slight but regular magnitude, then the exact point at which the catheter tube should be placed in the central venous cavity has been reached.

The catheter assembly at C is taped by tape means T to the patient's arm. Catheter tube extension 36 is joined to the forward end of junction fitting 20, as seen.

A surgeon, nurse or attendant now observes on the manometer scale the exact venous pressure of the patient, The zero setting of the manometer scale, again is disposed at a level equivalent to that of the right atrium of the heart, roughly the midaxillary line.

It is standard practice for intravenous supply tube 17 and manometer tube 23 to be transparent or at least translucent. Such enables the immediate observation of fluid and fluid level within the tubes. It is noted that in the present invention a surgeon, nurse or assistant can easily observe immediately the central venous pressure of the patient by pinching supply tube 17 allowing the fluid level in manometer tube 23 to drop to the true central venous pressure indication. If the patient is to be raised on the table upon which he is lying, or if he is to be transferred to a new location, then the manometer scale is easily adjusted to the new height of the midaxillary line of the patient. This is done conveniently by slipping the manometer scale 28 along manometer tube 23 and using an appropriate leveling device so as to level the zero index of the scale with the midaxillary line of the patient. It is further to be noted that when the manometer tube and scale combination are taped to the intravenous bottle as shown in FIG. 5, then the patient can be transported to any new location conveniently and the aforementioned combination simply suspended from the crossbar of the same or a new intravenous standard.

If, during surgery, for example, the patient's central venous pressure rises appreciably, i.e., above 10 centimeters, then this indicates that there is a heart failure, that the heart is not capable of pumping all of the fluid supply to it. In such event the usual hospital procedure is followed, and which may take any one of several forms.

Of special importance is inclusion in the scale of negative pressure readings. The negative pressures may occur where considerable blood is being spilled and/or where there is a lack of circulating fluid. Certain situations can occur in which the heart is attempting to pull more fluid out of the central venous reservoir than is actually present there. In such event the patient is given an increased liquid supply, even blood as by connection of a suitable blood supply to another point at the junction fitting 20.

There are a number of medical situations which indicate need for central venous pressure monitoring. These include: plasma or blood loss, either unmeasured or so great as to be immeasurable; blood fluid or plasma replacement in any patient with congestive heart failure, or with a history or threat of failure; miocardial failure of any cause in which determination of central venous pressure may help diagnose or predict failure and contribute to patient management; cardiovascular surgery where blood and fluid replacement is required right after surgery; hypertension of certain cause; trauma, and so forth.

The advantages of the manometer scale used in the present invention are many, among which include the fact that the scale is attached directly to a manometer tube, thus facilitating a very accurate reading; the scale is easily adjustable on the manometer tube to accommodate changes in the height disposition of the patient; the tube is easily and inexpensively manufactured and has convenient means for direct clipping of the manometer scale to the tube; the tube is centrally placed on the scale so that index indications appear immediately behind and in close proximity with the tube, and the tube is frictionally but slidably contained within the area delineated by tabs 34 and 35 and base 29 of the scale. In a preferred form of the invention the scale is manufactured of a rigid polyvinyl material that is first sheared to produce the tab boundaries for tabs 34 and 35, and then is formed as by heat or other means in the manner indicated in FIGS. 3 and 4 of the drawings.

The invention comprises a significant advance to the central venous pressure art for accurately determining under a variety of conditions the true central venous pressure of the patient.

While the invention has been described in terms of central venous pressure monitoring systems, it will be understood that a manometer scale and manometer scale and tube combination can be employed in other types of blood monitoring procedures.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, an intravenous bottle having a drip control, an intravenous supply tube coupled at one end to said intravenous bottle at said drip control, a catheter assembly having a catheter extension coupled to the remaining end of said intravenous supply tube at a junction, clamping means disposed on said intravenous supply tube, a flexible manometer tube coupled at one end to said junction and having a remaining, upwardly extensible end, clamping means disposed upon said manometer tube, and a manometer scale having securement means slidably and frictionally engaging, and thereby supporting said manometer scale from, said manometer tube above said manometer tube clamping means, and wherein said manometer scale comprises an elongate scale having an angulated cross section, said manometer tube being disposed at the vertex of said angulated cross section, said securement means frictionally retaining said manometer tube against said manometer scale proximate said vertex.

2. In combination, an intravenous bottle having a drip control, an intravenous supply tube coupled at one end to said intravenous bottle at said drip control, a catheter assembly having a catheter extension coupled to the remaining end of said intravenous supply tube at a junction, clamping means disposed on said intravenous supply tube, a flexible manometer tube coupled at one end to said junction and having a remaining, upwardly extensible end, clamping means disposed upon said manometer tube, and a manometer scale having securement means slidably and frictionally engaging, and thereby supporting said manometer scale from said manometer tube above said manometer tube clamping means, and wherein said manometer scale comprises a unitary, elongate manometer scale of angulated transverse cross section, said manometer scale including tab means as said securement means for frictionally though slidably retaining said manometer tube against said manometer scale.

3. Structure according to claim 2 wherein said tab means are sheared from and displaced forwardly of said angulated cross section.

4. A manometer scale comprising an elongate manometer scale base, and resilient tab means integral with said manometer scale base for receiving and slidably securing a manometer tube against said manometer scale base, wherein said manometer scale base includes a zero pressure index, positive pressure indexes incrementally disposed above said zero pressure index, and negative pressure indexes incrementally disposed beneath said pressure index, and wherein said manometer scale base has an angulated transverse cross section, said tab means being disposed in spaced relation over said manometer scale and thereby being constructed and arranged to slidably retain a manometer tube disposed between said tab means and said manometer scale base against the latter.